United States Patent

[11] 3,614,768

[72] Inventor Iben Browning
745 Distel Drive, Los Altos, Calif.

[21] Appl. No. 725,634
[22] Filed May 1, 1968
[45] Patented Oct. 19, 1971

[54] DIGITAL READOUT METHOD AND APPARATUS
3 Claims, 12 Drawing Figs.

[52] U.S. Cl. 340/325, 340/324, 340/378 B, 340/379, 350/115, 350/128, 350/167
[51] Int. Cl. G08b 5/32
[50] Field of Search 340/324, 366, 378, 378.1, 379, 325, 380; 350/127, 128, 167, 115

[56] References Cited

UNITED STATES PATENTS

| | | | |
|---|---|---|---|
| 1,984,004 | 12/1934 | Wildhaber | 350/167 X |
| 3,042,912 | 7/1962 | Gilbert | 340/324 X |
| 3,223,990 | 12/1965 | Clement | 340/324 |

*Primary Examiner*—John W. Caldwell
*Assistant Examiner*—David L. Trafton
*Attorney*—Limbach, Limbach & Sutton

ABSTRACT: A digital readout method and apparatus is disclosed wherein there is projected from a lens mosaic and film onto a screen a decimal number equivalent to the binary number at the input of a binary coded decimal displacement transducer to which the lens mosaic or film is mechanically connected for displacement proportional to the decimal value of the binary number at the input of the transducer.

INVENTOR.
IBEN BROWNING
BY
Townsend and Townsend
ATTORNEYS

INVENTOR.
IBEN BROWNING

BY

Townsend and Townsend
ATTORNEYS

DIGITAL READOUT METHOD AND APPARATUS

This invention relates to a new and improved digital readout method and apparatus for translating binary numbers to decimal digits.

It is an object of the present invention to provide a simple and inexpensive digital converter whereby an input corresponding to a binary number produces at the output the equivalent decimal number projected on a screen.

According to the present invention, a film is sequentially preexposed as the film is advanced to light in the configuration of each of the decimal digits focused through a lens mosaic to form on the film a multitude of exposure spots. The lens mosaic is oriented with respect to the film so that the sequential exposures through each of the lenses of the lens mosaic forms a series or a streak of spots nonoverlapping with the series or streak or spots from any other of the lenses in the lens mosaic as the film is advanced. The invention further contemplates mechanically connecting the film and/or the lens mosaic to a binary coded decimal displacement transducer for relative displacement of the film and lens mosaic a distance proportional to the decimal value of the binary number corresponding to the input to the transducer. The invention then contemplates focusing the light from a source through the lens mosaic and the film to thereby selectively project onto a screen the decimal digit corresponding to the relative displacement of the film and lens mosaic.

Other objects, features and advantages of the present invention will be more apparent after referring to the following specification and accompanying drawings in which.

Figure 7:
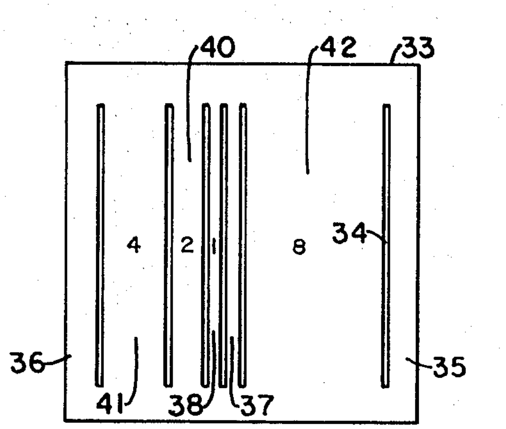
FIG. 7 is a plan view of a mechanical device for obtaining binary coded decimal displacement.
Figure 7B:
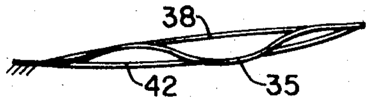
Figure 7A:
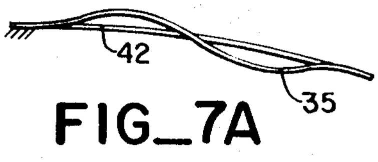

FIGS. 7*a* and 7*b* are cross-sectional views from the side of the device illustrated in FIG, 7 in two different displacement positions.

Figures 7C, 8:
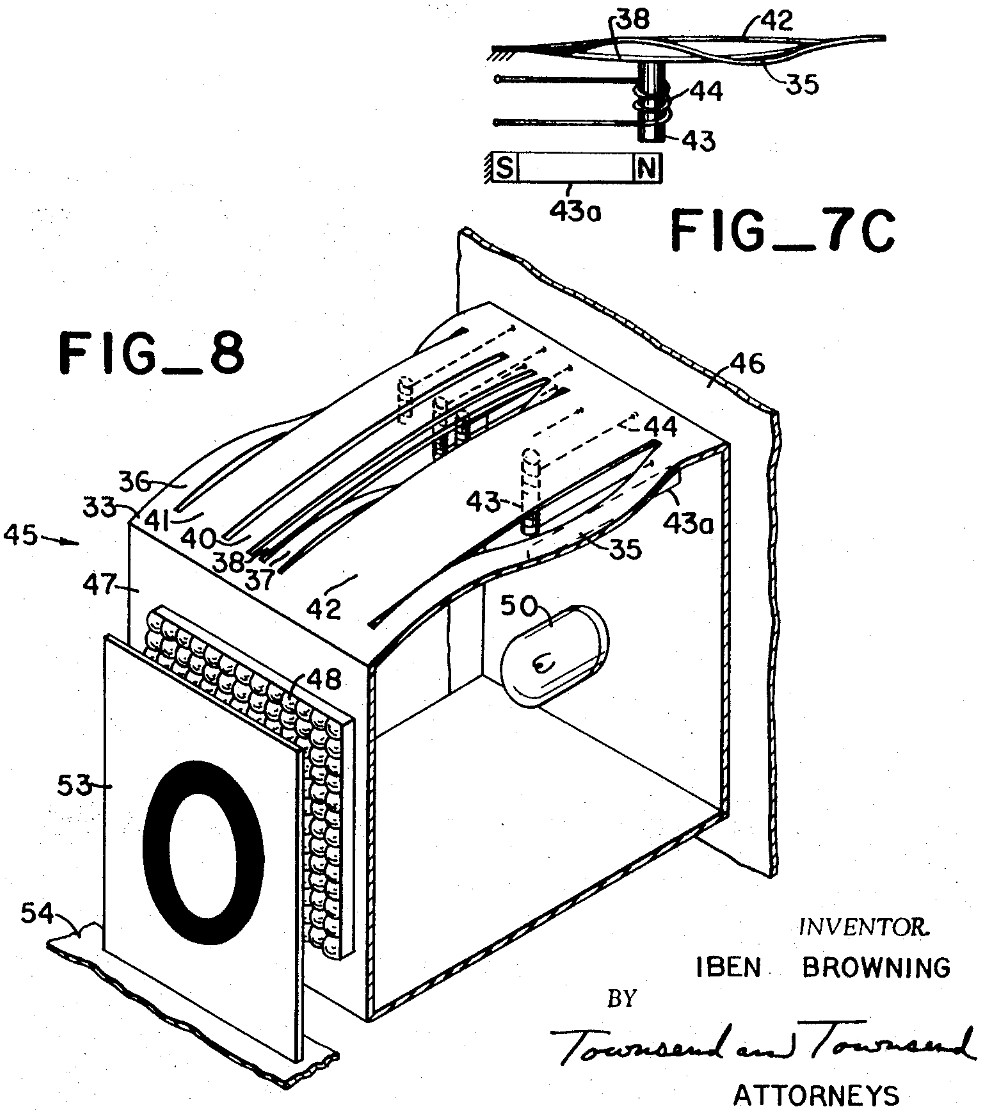

FIG. 7*c* is a cross-sectional view from the side of the device illustrated in FIG. 7 in another displacement position showing one means for displacement.

FIG. 8 is a perspective view of one form of apparatus embodying the present invention.

DESCRIPTION OF THE PREFERRED EMBODIMENTS

Figure 1:
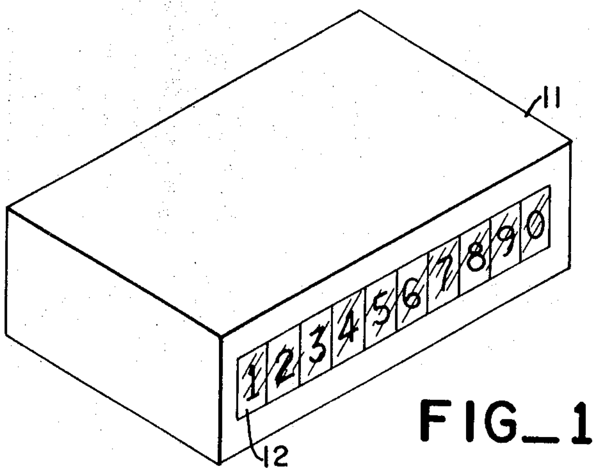
FIG. 1 is a perspective view of a console having a plurality of digital readout devices embodying the present invention.

FIG. 1 illustrates a console 11 containing a plurality of digital readout devices embodying the present invention, each including a light diffusing screen 12 on which is projected a decimal digit equivalent to the binary number corresponding to the input to that device. Positioned behind each screen is a film card 13 as illustrated in FIG. 2, movably mounted on tension means such as the springs 14 and mechanically connected by rod 15 to a binary coded decimal displacement transducer 16 shown in phantom in FIG. 2.

Figure 3:
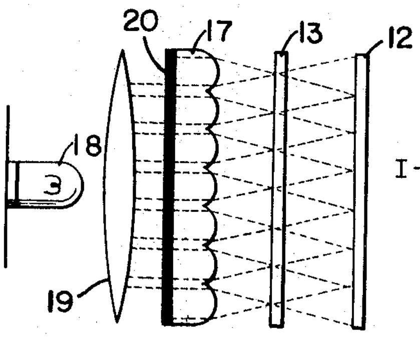
FIG. 3 is a diagrammatic side view of one arrangement for photographically recording the decimal digits on the film.

The microcard film is preexposed in a manner similar to that described in my U.S. Pat. No. 3,267,826 issued on Aug. 23, 1966. Such a method of photographic recording provides extremely dense information recordation so that each of the decimal digits may be exposed over substantially the entire card film area. A lens mosaic 17 is provided, and the film 13 spaced from the lens mosaic in the image plane, as illustrated in FIG. 3. Spaced from the lens mosaic 17 on the opposite side is a light source 18. Interposed between the lens mosaic and light source 18 is an opaque light mask 20 having a transparent configuration thereon in the form of one of the decimal digits. Thus, light from the source 18 is selectively transmitted through light mask 20 in the configuration of a decimal digit to be focused by lens mosaic 17 in the form of a plurality of exposure spots on the film card 13. The plurality of exposure spots so formed on film 13 carries the information of the configuration of the decimal digits on the light mask 20. The configuration of the light source, lens mosaic, and film during exposure of the film is the same as the arrangement of the elements in the digital readout device. A lens 19 or other means may be interposed between the light source and lens mosaic to provide parallel light as in FIG. 3. This is not necessary provided the light source is positioned similarly for both exposure or readout.

Figure 2:
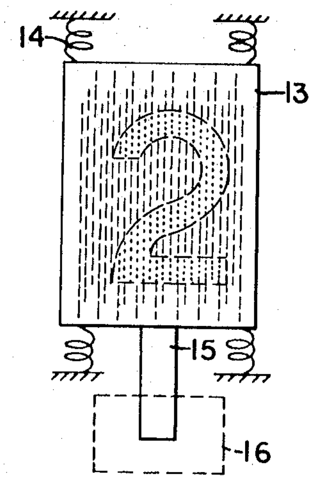
FIG. 2 is a diagrammatic wherein the view of a film according to the present invention wherein the decimal digits are sequentially photographically recorded, showing diagrammatically the nonoverlapping streaks of exposure spots produced by the lens mosaic.

The card film 13 is attached to the binary coded decimal displacement transducer with which it is to be used as illustrated in FIG. 2, and the film is exposed sequentially to each of the decimal digits, by using different light masks 20, at a different displacement position of the film card for each exposure, produced by a different displacement of the binary coded decimal displacement transducer corresponding to the decimal digit being exposed. The lens mosaic is oriented with respect to the film so that the sequential exposures through each of the lenses of the lens mosaic form a streak of spots, one spot for each exposure, and the streak of spots from any one of the lenses nonoverlapping with the streak of spots from any other of the lenses in the lens mosaic as illustrated diagrammatically in FIG. 2. Fig. 2 shown that when the film is positioned by the transducer in the numeral "2" position light is transmitted through the spots aligned with each of those lenses for projecting light onto the screen 12 in the shape of the numeral "2." Light from all the other lenses is blocked by the film spot aligned therewith. If the numeral were to be shown dark in an illuminated background the reverse situation would be true. It is thus apparent that light from a source focused through the lens mosaic onto the preexposed film 13 with the elements in the same position will selectively project only one of the decimal digits recorded on the card onto screen 12 depending upon the position of the preexposed film card 13 with respect to the lens mosaic. Readout of the prerecorded decimal information takes place as shown in FIG. 3 with the light mask 20 removed. A decimal number is projected on screen 12 depending upon the relative positions of the elements of the optical train.

Alternatively, the lens mosaic may be attached to the displacement transducer and the film fixed relative to motion of the lens mosaic. In another form of the invention, the light source may be attached to the transducer for displacement relative to the lens mosaic and film with the same result. Furthermore, any combination of relative motion between the film, lens mosaic, and light source will produce the desired result. The relative motion need not be linear producing linear streaks of spots but can be circular, spiral or otherwise producing rasters on the film. Thus, the displacement produced by the transducer need not be linear but can be circular, spiral or otherwise to produce rasters from the sequential exposure spots on the film provided the rasters are nonoverlapping.

According to another aspect of the invention, the decimal digits and numbers need not be recorded on film transparencies. Thus, any suitable light modulating plane may be used instead of the film such as an etched metal plate or a diffraction grating provided that the light modulating plane modulates the light incident thereon through lens mosaic 17 with different decimal number information corresponding to different relative displacements of the lens mosaic, light modulating plane, and light source.

It is apparent that the present invention has application beyond digital converters and may be used for any selective symbol display for the display of symbols or images according to the coded signal input to a displacement transducer. Thus, any of a variety of symbols or images may be displayed selectively by the displacement action of a transducer according to the present invention.

It is also apparent that the displacement produced by the transducer need not be binary coded decimal displacement but any pattern of displacement providing different displacements for each binary number or coded signal at the input to the transducer and provided that preexposure of the film or prerecording on the light modulating plane of decimal number information or symbol or image information takes place in the same manner as the subsequent digital or symbol or image readout operation of the readout assembly. In the forms of the invention hereinafter described the transducers are programmed for binary coded decimal displacement, making maximum use of the available information recording space on the film or light modulating plane.

Figure 4:
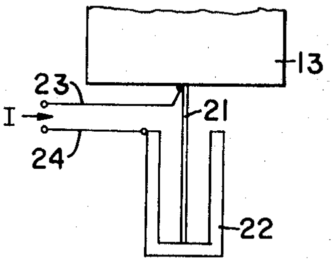
FIGS. 4, 5 and 6 are diagrammatic front views of three types of electromechanical binary coded decimal displacement transducers suitable for use in the present invention, Fig. 4*a* being a graph of the current input to the transducer shown in FIG. 4.
Figure 5:
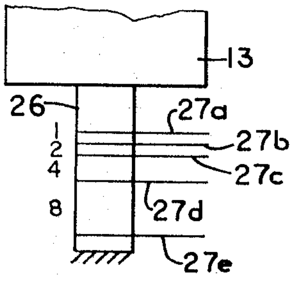
Figure 6:
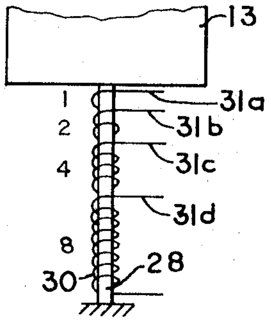

FIGS. 4–6 illustrate schematically three forms of transducers in which the output is a displacement proportional to the decimal value of the binary number corresponding to the input, and suitable for use in the present invention. In each case the lens mosaic or the film card is connected to the transducer and movably mounted by tension means as illustrated in FIG. 2.

Figure 4A:
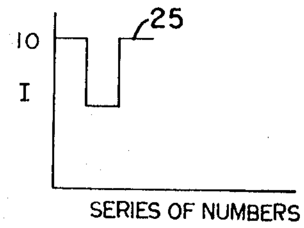

In the transducer shown in FIG. 4, a wire 21 of resistive material such as for example chromel wire is connected between the film card 13 or the lens mosaic and a fixed base 22 of a material providing thermal compensation. The input to the transducer comprises current through wires 23 and 24 connected respectively to the resistive wire 21 where it joins the lens mosaic or film card 13 and fixed base 22. The longitudinal dimension of wire 21 varies in proportion to the current through wires 23 and 24. The binary output of a counter or other computing device may be put through a digital to analog converter to obtain a current proportional to the decimal value of the binary number of the output of such computer device. The current 25 as illustrated in FIG. 4*a*, proportional to the decimal value, produces a proportional displacement of the film card 13 relative to the lens mosaic and light source, thereby placing the appropriate decimal number in position to be projected on screen 12.

In the transducer illustrated in FIG. 5, the film card 13 or the lens mosaic is connected to an elongated piezoelectric material 26 to which are connected electrical terminals 27 at distances proportional to the decimal value of the first four binary digit spaces, namely in the proportion 1 to 2 to 4 to 8. Electrical connections may be made by metal plating at the points of contact with the piezoelectric material. THe output from a binary counter in the first binary digit position would be connected to the terminals 27*a* and 27*b*, the output from a binary counter corresponding to the second binary digit position connected to 27*b* and 27*c*, etc. A signal from one of the binary counters would produce a displacement of the piezoelectric material proportional to the decimal value of the binary number corresponding to the signal at the input, thereby displacing the film 13 relative to the lens mosaic and light source to the appropriate position for projection of the decimal digit onto screen 12 corresponding to the decimal value of the binary number at the input. Signals from a plurality of counters would produce a displacement of the piezoelectric material corresponding to the decimal value of the sum of the binary digits corresponding to the input.

In the transducer illustrated in FIG. 6, the film 13 or lens mosaic is connected to an elongated piece of magnetostrictive material 28 on which is wound a solenoid 30 with the electrical connections 31*a*–31*d* at numbers of turns along the solenoid proportional to the decimal value of the first four binary digit spaces. Thus, as shown in FIG. 6, electrical connections 31 are provided encompassing 1, 2, 4, and 8 turns of the solenoid enclosing magnetostrictive material 28. The longitudinal dimension of magnetostrictive material 28 varies in proportion to the magnetic field to which it is subjected which is proportional to the number of turns. The output from a binary counter corresponding to the first binary number position would be connected to terminals 31*a* and 31*b*, the output from a binary counter corresponding to the second binary number position to electrical terminals 31*b* and 31*c*, the output from a binary counter corresponding to the third binary number position to 31*c* and 31*d*, etc. Displacement of magnetostrictive material 28 and therefore film card 13 relative to the lens mosaic-light source is thus proportional to the decimal value of the binary number at the input of the electrical terminals.

Another binary coded decimal displacement transducer suitable for use in the present invention is illustrated in FIG. 7 and FIGS 7*a*–7*c*, with the complete embodiment of the invention illustrated in FIG. 8. According to this form of the invention a rectangular sheet 33 of flexible plastic or metal is formed with a plurality of slits 34 separating portions of the sheet 33 of widths proportional to the decimal value of the first four places of the binary number system. Thus, as shown in FIG. 7, portions of the sheet 33 are provided between the slits with widths in the proportion 1 to 2 to 4 to 8. At each side 35 and 36 and at the center 37 of sheet 33 bands of the sheet material are provided to be kinked into an S curve or otherwise deformed for snap action as illustrated in FIGS. 7*a*, and 7*b*.

The deformation or kinking of portions 35, 36, and 37 into S curves shortens the length of these portions causing the remainder of sheet 33 to bow in one direction or another. As a result bands 38, 40, 41 and 42 having widths proportional to the first four places of the binary system may each rest in either of two stable positions, that is, with s bow outward or a bow inward as illustrated in FIGS. 7*a* and 7*b*. In FIG. 7*a*, one side of sheet 33 is permanently fixed and each of the bands 38, 40, 41 and 42 are bowed outwardly in the same direction. In FIG. 7*b*, the sheet 33 is again fixed at one side but only bands 38, 40 and 41 are bowed outwardly while band 42 is bowed inwardly producing a displacement of the free end of sheet 33 in an upward direction. The amount of displacement is determined by which and how many of bands 38, 40, 41 and 42 are bowed from the zero position.

As illustrated in FIG. 7*c*, means are provided for moving each band between its two stable positions by connecting a rod 43 of permeable material to each of the bands 38, 40, 41 and 42 and placing and attaching a solenoid 44 with flexible leads around each rod. Fixed in position relative to each rod is a permanent magnet 43*a* positioned with one pole adjacent the bottom of each rod. Thus, upon activation of a solenoid the corresponding permeable rod 43 is drawn to or repelled from the fixed permanent magnet 43*a*. Alternatively, the rod 43 may be formed from a permanent magnet with the solenoid rigidly positioned concentrically around and spaced from a pole of the magnet at the bottom of the rod. The output from a binary counter corresponding to the first positions of the binary number system would be connected to the solenoids surrounding the permeable rods connected to the bands 38, 40, 41 and 42.

A complete embodiment of the invention utilizing this binary coded decimal displacement device is illustrated in FIG. 8 wherein the sheet 33 forms the top of a supporting frame generally indicated by numeral 45. One side of frame 45 is rigidly connected to a fixed wall 46 thereby providing a fixed end for the sheet 33 at wall 46. Connected to each of the bands 38, 40, 41 and 42 are the permeable rods 43 enclosed by attached solenoids 44 with flexible leads fixed to the back of frame 45 or the wall 46 and having electrical outlets at the back of frame 45. The permanent magnets 43*a* are rigidly fixed to the wall so that the permeable rod will move upon activation of the solenoid.

On the free end 47 of frame 45 is positioned a lens mosaic 48. The lens mosaic 48 being attached to the free end of sheet 33 is displaced in a vertical direction a distance depending on which and how many of the bands 38, 40, 41 and 42 are changed in position by activation of the corresponding solenoids. In the example shown in FIG. 8, when each of the bands is bowed in an upward direction the lens mosaic 48 is in the zero or rest position. Activation of the solenoid snaps the corresponding band to a downward bow in the second position producing a vertical displacement upward of the free end of sheet 33 and lens mosaic 48 due to the snap action produced by bands 35, 36, and 37, proportional to the decimal value of the binary number corresponding to the inputs to the solenoids.

Spaced from the lens mosaic 48 and positioned within frame 45 and connected to the fixed wall 46 is a light source 50 arranged with respect to the lens mosaic in the same manner as the light source used to preexpose the film card 53.

Spaced from the lens mosaic 48 on the side opposite the light source and in the image plane of the lens mosaic is film card 53 on which is preexposed the decimal digits in the manner heretofore described. In this form of the invention the film card 53 is rigidly connected to a fixed position 54 unconnected with the frame 45 so that film card 53 maintains a stationary position while the lens mosaic 48 undergoes vertical translation due to bowing in the bands 38, 40, 41 and 42.

Film card 53 is spaced from the lens mosaic a distance placing it in the image plane of the individual lenses comprising the lens mosaic so that light from the source 50 is focused by the lens mosaic 48 onto the film 53, through the film and onto a light diffusing screen here not shown to project thereon the decimal digit on which the light from the lens mosaic 48 is focused. The decimal digit projected will correspond to the decimal value of the displacement of free end of sheet 33 and lens mosaic 48 produced by the bowing of bands 38, 40, 41 or 42 due to the binary input at the solenoids. Thus, the output from binary counters connected to the input of the appropriate solenoids produces a displacement proportional to the decimal value of the binary number corresponding to the input, appropriately positioning the lens mosaic 48 to focus spots of light on the appropriate decimal digit and thereby project that digit onto a screen.

While several embodiments of this invention have been shown and described it will be apparent that other adaptations and modifications can be made without departing from the true spirit and scope of the invention.

I claim:

1. A digital readout system comprising: a light source; a lens mosaic spaced from said light source; a film positioned adjacent said lens mosaic on the side opposite the light source in the image plane of the lenses comprising the lens mosaic, said film being sequentially preexposed to light in the configuration of decimal digits in the form of a multitude of exposure spots formed by the lens mosaic, said film being moved between exposures relative to said lens mosaic, said lens mosaic being oriented with respect to the film so that the sequential exposures through each of the lenses of the lens mosaic forms a series of spots for each of the lenses in the lens mosaic separate from the spots for the other lenses in the lens mosaic; and a binary coded decimal displacement transducer for providing relative motion between at least two elements of the source, the film and the lens mosaic, said film and lens mosaic being relatively displaced by said transducer a different distance for each binary number corresponding to the input to the transducer, said film having its preexposed portions, each appropriately on the film at a distance equal to the displacement of the displacement transducer corresponding to the decimal digit preexposed on the preexposed portion, said binary coded decimal displacement transducer comprising a sheet of flexible material having formed therein a plurality of longitudinal slits alternating with bands of the flexible material of varying widths proportional to the decimal value of digit places of the binary system whereby each of said bands may assume either of two stable positions with the bow in one direction or another; a plurality of rods of a magnetic material, one each of said rods fixed at one of its ends to the surface of each of the bands of varying width in the sheet of flexible material; a plurality of solenoids, a solenoid axially enclosing at least a portion of each of said rods of magnetic material, the input to each solenoid corresponding to the binary digit place having an equivalent decimal value proportional to the width of the band of flexible material to which the respective rod of magnetic material is fixed whereby upon activation of the solenoids the free end of said sheet of flexible material is displaced a distance proportional to the decimal value of the binary number corresponding to the input to said solenoids.

2. A digital readout system comprising: a light source; a lens mosaic spaced from said light source and formed of a closely packed array of lenses; a film positioned adjacent said lens mosaic on the side opposite the light source in the image plane of the lenses comprising the lens mosaic, said film having a streak of spots for each lens of the lens mosaic, each streak containing information for the respective lens and said streaks formed by sequentially preexposing said film through said lens mosaic to sequential images in the configuration of decimal digits, each image forming a spot on the film for each lens of the lens mosaic and each spot having an intensity which is an analog of the total intensity of that portion of the decimal image incident on the respective lens of the lens mosaic with said film moved between exposures relative to said lens mosaic, said lens mosaic being oriented with respect to the film during exposure so that sequential exposures through each of the lenses of the lens mosaic form a streak of spots on the film for that lens and nonoverlapping with the streak of spots from any of the other lenses and similarly oriented in said readout system; and a displacement transducer for providing relative motion between elements of the group of elements consisting of said source, said film and said lens mosaic, the amount of relative motion by said transducer being different for different input signals to said transducer and each different amount of relative movement providing alignment of said group of elements for displaying a different decimal digit.

3. A digital readout system as set forth in claim 2 wherein said displacement transducer is a binary coded decimal displacement transducer.